United States Patent [19]

Mota et al.

[11] Patent Number: 5,195,589
[45] Date of Patent: Mar. 23, 1993

[54] TOOL FOR SIMULTANEOUS VERTICAL CONNECTIONS

[75] Inventors: Juvenal D. Mota, Rio de Janeiro; Joel d. Miguez, Salvador, both of Brazil

[73] Assignees: Petroleo Brasileiro S.A., Rio de Janeiro; Conforja Equipetrol S A, Salvador, both of Brazil

[21] Appl. No.: 775,899

[22] Filed: Oct. 15, 1991

[30] Foreign Application Priority Data

Oct. 12, 1990 [BR] Brazil .................. PI 9005130

[51] Int. Cl.$^5$ .................. E21B 33/038; E21B 43/013
[52] U.S. Cl. .................. 166/341; 166/344; 166/366; 166/381
[58] Field of Search .................. 166/344, 366, 339, 341, 166/97.5, 379, 380, 381; 285/18, 133.2, 137.1, 137.2, 28, 29, 25, 26

[56] References Cited

U.S. PATENT DOCUMENTS

| | | | |
|---|---|---|---|
| 3,331,437 | 7/1967 | Jones | 166/368 |
| 3,516,492 | 6/1970 | Petersen | 166/344 X |
| 3,545,541 | 12/1970 | De Vries | 166/368 X |
| 3,601,189 | 8/1971 | Folker et al. | 166/366 X |
| 4,438,817 | 3/1984 | Pokladnik et al. | 166/344 X |
| 4,848,474 | 7/1989 | Parizot et al. | 166/366 |
| 5,010,956 | 4/1991 | Bednar | 166/344 |

Primary Examiner—Stephen J. Novosad
Attorney, Agent, or Firm—Sughrue, Mion, Zinn, Macpeak & Seas

[57] ABSTRACT

A universal tool for simultaneous vertical connections between two flow line terminals to be connected includes two vertical hydraulic connectors (2, 3) for locking to the fishing mandrels (43, 44) of the bridge of connectors (41). A vertical compensation system provides upwards and downwards movement of the structure (6) which supports the second connector (3). A turning system of the structure is employed and a guideline orientation system includes two structural arms (4). Each arm contains a funnel in its extremity, utilized for orientation with cables and guide posts. A horizontal movement system acts through a hydraulic cylinder (17) which has a shaft (18) coupled to a telescopic arm (20). An angular compensation system utilized in the second connector (3) acts through a spherical-shaped articulation (24) which supports, through a pin (58), a supporting shaft (27) of the second connector (3). A turning system of the second connector (3) is operated through the extension and retraction of a pair of shafts of cylinders (21, 22).

13 Claims, 5 Drawing Sheets

TOOL FOR SIMULTANEOUS VERTICAL CONNECTIONS

FIELD OF THE INVENTION

This invention relates to a universal tool for simultaneous vertical connections, the main purpose of which is to locate in one single instrument of easy handling, operationality and susceptible of maintenance, the whole active system involved, which, by means of appropriate mechanisms, correctly positions a bridge of connectors on two flow line terminals pertaining to equipment units to be connected.

BACKGROUND OF THE INVENTION

In subsea completion systems, the utilization of which is increasing, becomes more complex with their orientation towards deep waters. Such becomes vital, as a major step towards the development and improvement of those systems, the necessity of a remote connection system which does not sophisticate the most complex equipment units in the system, and which provides also a method of maintenance and adjustment in the connection system without the necessity of handling those complex equipment units.

SUMMARY OF THE INVENTION

This invention provides a tool for simultaneous vertical connections utilized in a system which introduces a concept of subsea remote connection between two terminal mandrels of flow lines which, since they are located in different structures or equipment units, present deviations due to manufacturing, erection, installation tolerances. It becomes necessary that the tool which performs such connection be provided with systems which render it compatible with those deviations. The connection between the flow line terminals is carried out through a module or bridge containing two hydraulic connectors united by a bridge of flexible or articulated lines which absorb the imposed movements which may become necessary.

The tool activates, with the hydraulic and mechanical mechanisms required for the correction of the vertical horizontal-angular deviations. The mechanisms make it possible to fit the module of connectors. It is also possible to recover the tool for eventual maintenance, thus rendering all the active elements of the system, recoverable allowing for increased flexibility in the use of the equipment and a rather significant simplification of the problem of tolerances.

An advantage offered is to prevent the interruption of a well's operation for purpose of maintenance is some equipment from interfering with the production of the other wells, since the concept herein presented implies a modularization per well.

Another advantage is to transfer to the tool of installation of the intervention connectors the whole active system required for the compensation of the deviations, avoiding the utilization of very strict tolerances in the manufacturing and erection of the equipment units which affect directly or indirectly the final positioning of the flow line terminals, since the whole system required for the correction of misalignments is located in the tool, which tool is susceptible of being maintained and adjusted.

Another advantage is the simplification in the operation of the more complex equipment units (WCT-Manifold) and reduction in the possibility of failure of same during the operation. Such units no longer have the active connection of the system, by transferring the possibility of failure in the connection, from the complex equipment units to the bridge of connectors, thereby reducing the possibilities of failure in the installation possibilities of maintenance of those equipment units, since WCT-Tree Module-Manifold equipment units have a lower number of seals, and a smaller number of simultaneous connections. Further, they distributed in the bridges of connectors (one per well). In addition, flexible or articulated lines not longer are located in those equipment units. The handling of those equipment units are avoided as much as possible since it becomes sometimes complex and time-consuming, as follows: WCT (requiring well killing, safety plug installation, etc.), and the Manifold (requiring the production paralyzation of other wells until is made).

Still another advantage is the standardization of one single tool to make connections between terminals containing any arrangement of flow lines. The standardization allows the tool to be utilized with any arrangement of flow lines pertaining to any equipment units (WCT-Tree Module-Manifold-Export Line Connectors) which are to be connected:

It is, thus, an object of this invention to provide a universal tool for simultaneous vertical connections which, through mechanisms, correctly positions a bridge of connectors on two terminals of flow lines pertaining to equipment units to be connected. The tool includes two vertical hydraulic connectors for locking to fishing mandrels of the bridge of connectors, a vertical compensation system with upwards and downwards movement of the structure which supports the second connector, and a system for structure turning. Further, the tool comprises a system of guideline orientation including two structural arms. Each arm contains a funnel in its extremity, utilized for orientation of cables and guide posts. A horizontal movement system through a hydraulic cylinder has a shaft coupled to a telescopic arm. An angular compensation system is utilized in the second connector of the tool, through a spherical-shaped articulation which supports, by means of a pin, the supporting shaft of the second connector of the tool. A turning system of the second connector, is achieved through the extension and retraction of the cylinder shafts. It is a further object of this invention to form a bridge of vertical connectors united by flexible or articulated lines. The arrangement of those lines is in accordance with what is to be connected, it being the case of flow lines only (production-annulus-injection) or of flow lines/hydraulic umbilical (for control) and electric cable (for monitoring of some equipment unit) in any desired arrangement.

BRIEF DESCRIPTION OF THE DRAWINGS

The invention is hereafter described more in detail together with the drawings which accompany this specification, in which.

DESCRIPTION OF THE PREFERRED EMBODIMENTS

Figure 1:
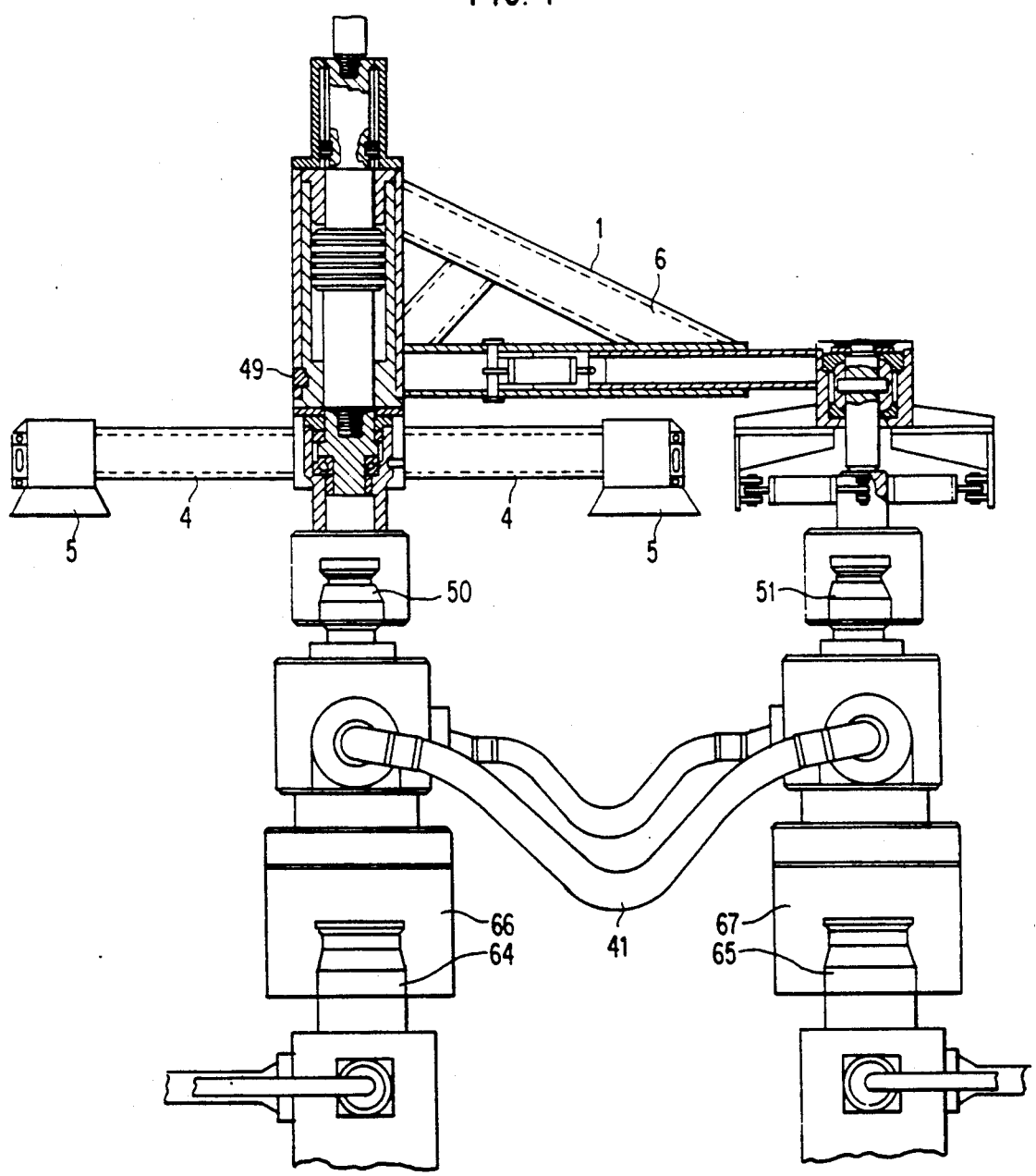
FIG. 1 is a section view of a tool for simultaneous vertical connections installed on a bridge of connectors which contains the jumper of flow lines necessary for the connection between two flow line terminals.

As it can be inferred as from the Figures, the universal tool for simultaneous vertical connections, designated in general by the numerical reference 1, utilized for installation of a bridge of connectors 41 containing a jumper of flexible lines (flow lines-hydraulic umbilical electric cable; in any desired arrangement), which shall achieve the connection between two flow line terminals 64, 65, includes two vertical hydraulic connectors 2, 3 for locking to the fishing mandrels 50, 51 or the bridge of connectors 41. A vertical compensation system provides upwards and downwards movement of the structure 6 which supports the second connector 3. A turning system of the structure 6 is through a set of bearings 54, 55, 56. A system of guideline orientation includes, externally to the case 7, two structural arms 4, each one containing in its extremity a guide funnel 5 utilized for orientation with cables and guide posts, a horizontal movement system through a hydraulic cylinder 17 which has the shaft 18 coupled to a telescopic arm 20. An angular compensation system is utilized in the second connector 3, FIG. 5, through a spherical-shaped articulation 24 which supports, through the pin 58, the supporting shaft 27 of the second connector 3. A turning system of the second connector 3 is operated through the simultaneous extension and retraction of the shafts of the cylinders 21, 22.

Figure 4:
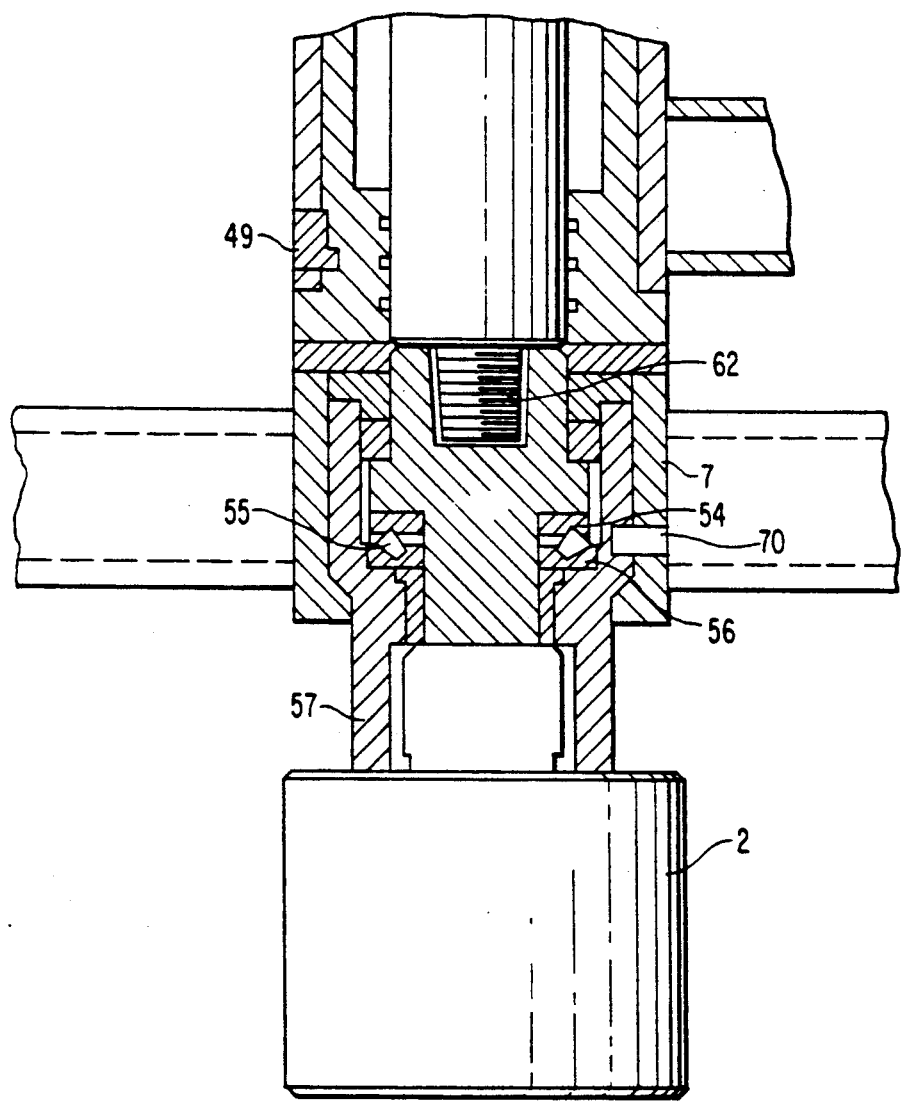
FIG. 4 is a section view of the rotational system of the tool.

The tool 1, the object of this invention, correctly positions, through mechanisms, a bridge of connectors 41, FIG. 4, on two flow line terminals 64, 65 pertaining to equipment units to be connected. First is achieved the connection of the first connector of the bridge 66, in the first flow line terminal 64, where the correct positioning and necessary load is achieved through the movement of the operation column 61. In this movement the second connector of the bridge 67 is out of position.

The orientation of the second connector of the bridge 67 is achieved through a combination of movements, as follows. Turning of the structure 6 is effected by turning the central body 8 of the operation column 61 on a set of bearings 54, 55, 56 internally to the case 7. Vertical movements is effected through a system located below the connection with the components 8, 9, 10, 11 of the operation column. Horizontal movement is effected through a hydraulic system 17, 18 installed in a telescopic arm 19, 20. Rotational movement is effected through a hydraulic system 21, 22 externally coupled in a cylinder 52 located at the upper part of the second connector 3. Angular movement is effected through a spherical coupling system 24 set in split housings of spherical internal sections 25, 26, on which is attached the supporting shaft of the second connector 3 of the connection tool 1. Rotational movement is effected in the second connector of the tool through a hydraulic system (21, 22) located at the upper part of the same.

Figure 3:
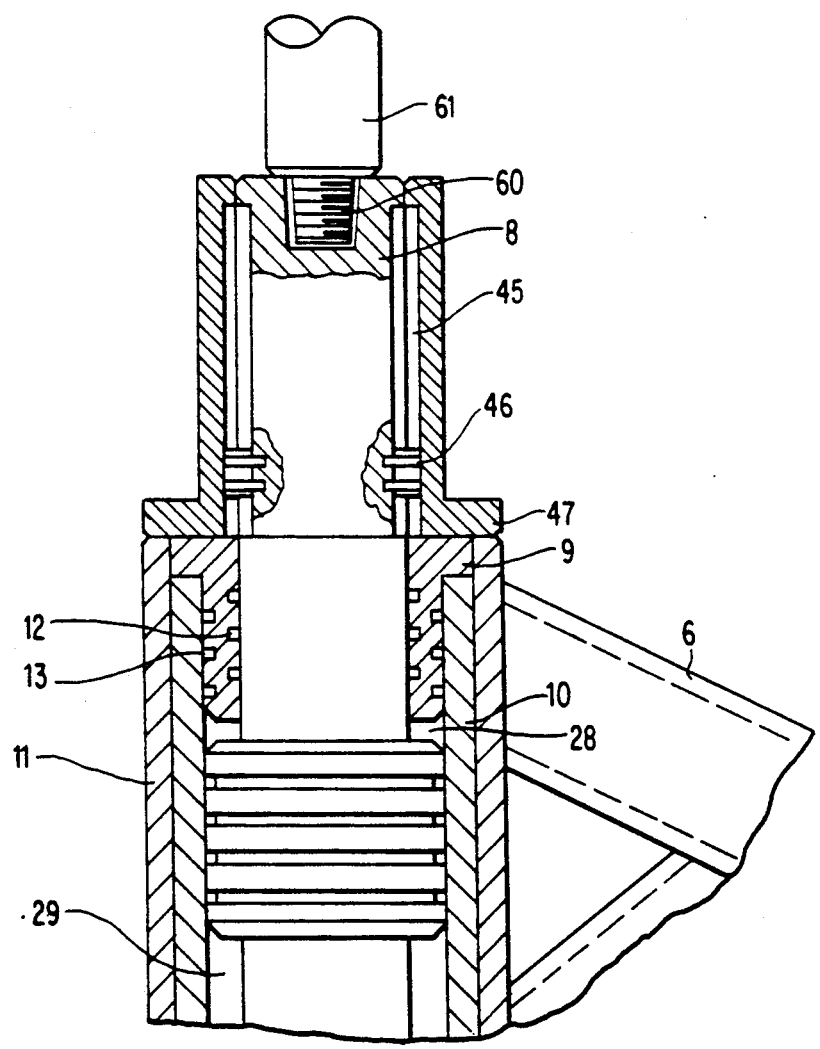
FIG. 3 is a section view of the vertical compensation system of the tool.

In the vertical compensation system, the upwards movement of the structure 6 is achieved through the application of pressure in the chamber 28, FIG. 3, and the downwards movement is achieved through the application of pressure in the chamber 29. The movement of the structure 6 is achieved through the components, 9, 10, 11 which are the moving components driven by means of pressure. The central component 8 forms the rigid element of the system so that the components 9, 10, 11 may move. The sealing required for the action of the hydraulic pressure in the chambers 28, 29 is effected by dynamic sealing rings 12, 13.

In the turning system of the structure 6, the central component 8 presents, in its upper extremity, a female thread 60 compatible with the operation column 61, and presents, in its lower extremity, a male thread 62, for coupling to a body (68) which is supported in a set of bearings 54, 55, 56. That set of bearing allows, through the turning of the operation column 61, the turning of the structure 6 which positions the second connector 3. A body 57 allows for the independence of the set of bearings in relation to the first connector 2 which remains locked and fixed during the turning of the structure 6 with the second connector 3. The rotation is transmitted to the structure 6 through slot keys 46, 49. The slot key 46 works in a vertical play 45 in the sleeve 47, so as to allow for the movement of the vertical compensation system.

Figure 2:
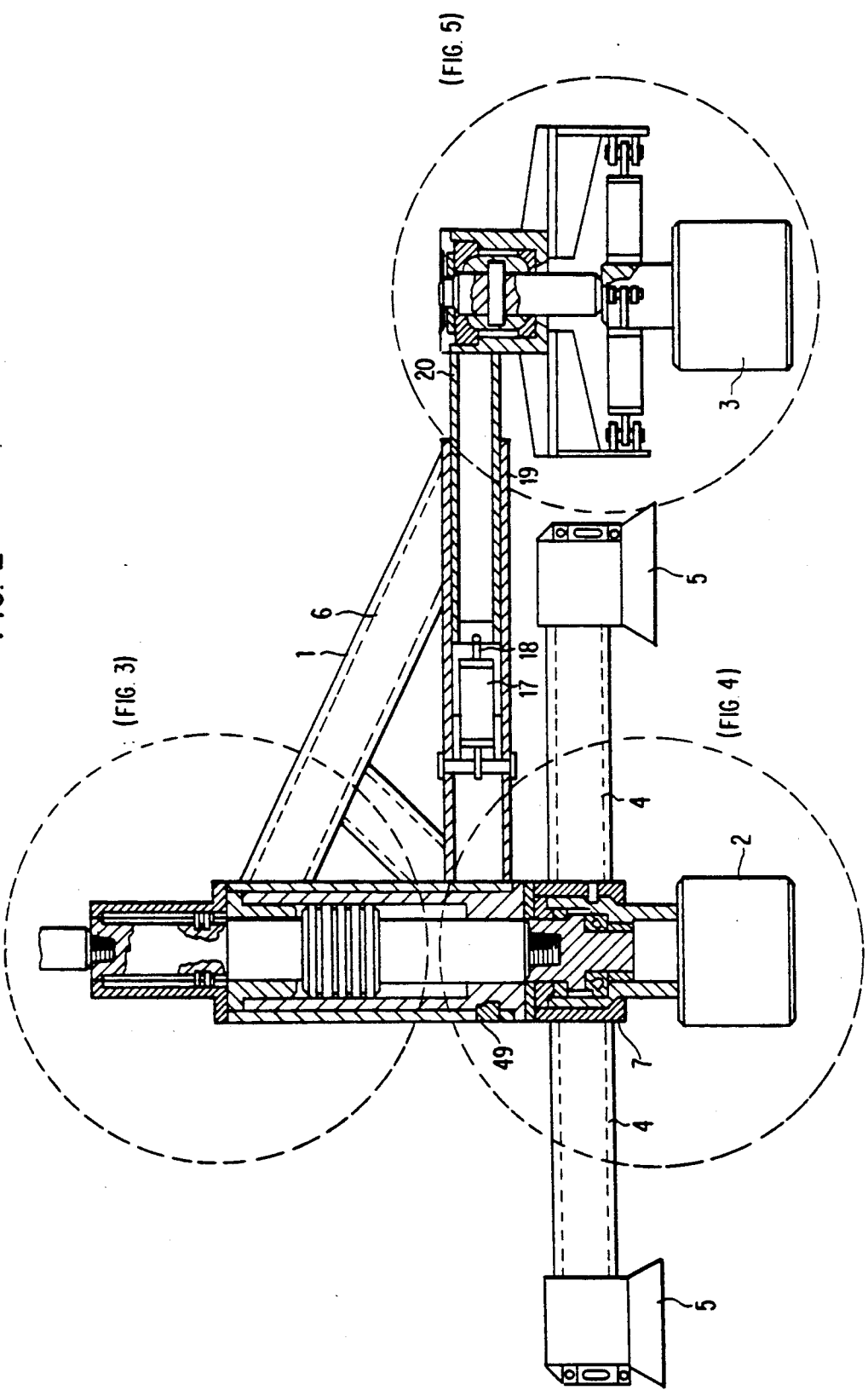
FIG. 2 is a section view of the tool.

In the horizontal movement system, with the extension or retraction (through hydraulic pressure in the cylinder 17), FIG. 2, the shaft moves horizontally, attached to the second connector 3.

Figure 5:
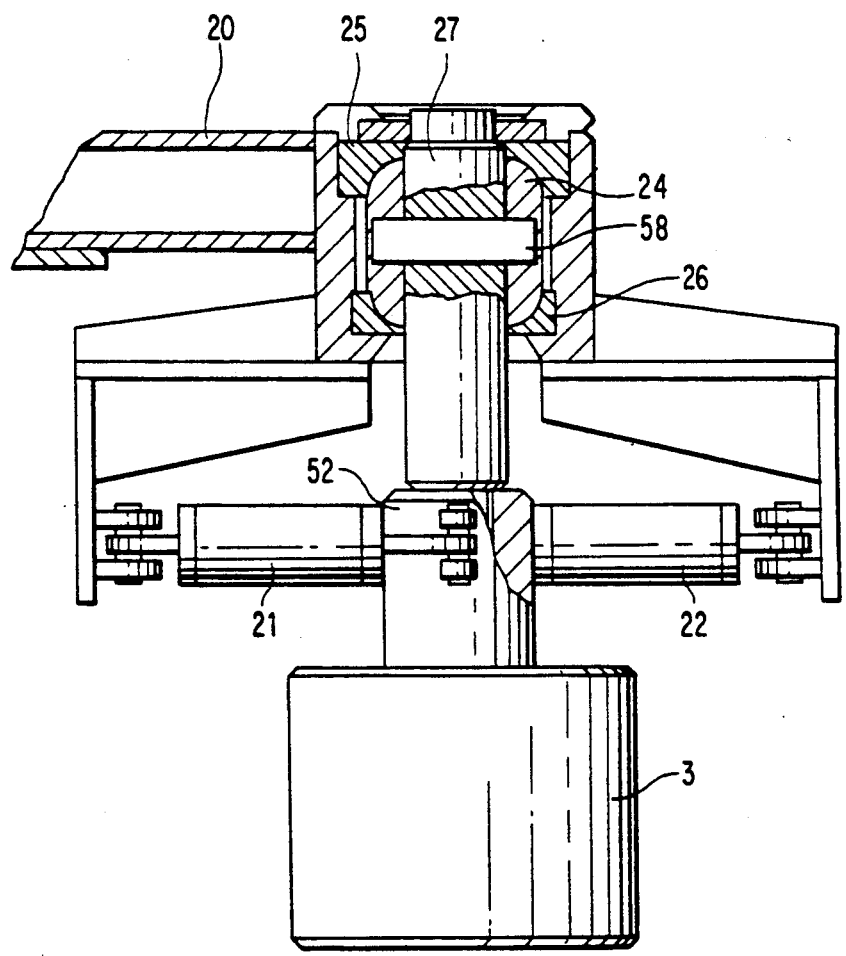
FIG. 5 is a section view of the angular compensation system of the tool.

In the angular compensation system, the articulation 24, FIG. 5, works induced by accommodation movements between the second connector of the bridge of connectors 67, FIG. 1, and the second flow line terminal 65, sliding on spherical-shaped housings 25, 26.

With respect to the guideline orientation system, orientation is utilized for the correct positioning of the first connector of the bridge 66 in operation of system installation and orientation of the first connector 2 in operation of re-installation of the tool 1 for removal of the bridge of connectors 41. The attachment of the guide arm 4 to the first connector 2 is achieved by means of the slot key 70, FIG. 4.

It must be pointed out that the tool for simultaneous vertical connections 1, the object of this invention, can be utilized for connection between any flow line arrangements, having therefor a hydraulic telescopic system, which provides the bridge of connectors with the necessary spacing of the lines to be connected.

We claim:

1. Tool for simultaneous vertical connections by installation of a bridge of fluid connectors (41) for connecting flow line terminals (64, 65) for fluid flow therebetween and containing a jumper of flexible lines and fishing mandrels (50, 51) for achieving the connection between said flow line terminals (64, 65), said tool comprising:

vertical, first and second hydraulic connectors (2, 3) for locking to the fishing mandrels (50, 51) of said bridge of fluid connectors (41);

a vertical compensation system of upwards and downwards movement of a structure (6) supporting said second connector (3);

a turning system of said structure (6) comprising a set of bearing (54, 55, 56) located in a lower part of said vertical compensation system allowing for the turning of said structure (6) relative to said first connector (2);

a guideline orientation system external to a case (7), consisting of two structural arms (4), each of said two structural arms (4) having in an extremity thereof, a guide funnel (5) for orientation with cables and guide posts;

a horizontal movement system via a hydraulic cylinder (17) having a shaft (18) coupled to a telescopic arm (20);

an angular compensation system utilized in said second connector (3) via a spherical-shaped articulation (24) supporting, through a pin (58), a supporting shaft (27) of said second connector (3); and a turning system of said second connector (3) operated through the extension and retraction of respective shafts of cylinders (21, 22).

2. Tool for simultaneous vertical connections, according to claim 1, wherein, in said vertical compensation system, the upwards movement of said structure (6) is effected through application of fluid pressure in a chamber (28).

3. Tool for simultaneous vertical connections, according to claim 1, wherein, in said vertical compensation system, the downwards movement of said structure (6) is achieved through the application of pressure to a chamber (29).

4. Tool for simultaneous vertical connections, according to claim 2, wherein the movement of said structure (6) is achieved through moving components (9, 10, 11) driven by pressure and a central component (8) forming a rigid element of the system allowing for the movement of the components (9, 10, 11).

5. Tool for simultaneous vertical connections, according to claim 1, wherein, in said turning system of the structure (6), said central component (8) presents, in its lower extremity, a male thread (62) for coupling to a body supported by a set of bearings (54, 55, 56).

6. Tool for simultaneous vertical connections, according to claim 5, wherein said set of bearings (54, 55, 56) allows, through the rotation of an operation column (61), the turning of said structure (6) which positions said second connector (3).

7. Tool for simultaneous vertical connections, according to claim 5, wherein a body (57) allows independence of said set of bearings (54, 55, 56) with respect to said first connector (2), and said first connector (2) remains locked and fixed during the turning of said structure (6) with said second connector (3).

8. Tool for simultaneous vertical connections, according to claim 5, wherein rotation is transmitted to said structure (6) by means of slot keys (46, 49), and said slot key (46) operates with a vertical play (45) in the sleeve (47) to allow movement of said verticla compensation system.

9. Tool for simultaneous vertical connections, according to claim 1, wherein, in said horizontal movement system, extension or retraction through hydraulic pressure in a hydraulic cylinder (17) causes the horizontal movement of a shaft, attached to said second connector (3).

10. Tool for simultaneous vertical connections, according to claim 1, wherein, in said angular compensation system, an articulation (24) operates induced by accommodation movements between said second connector of the bridge of connectors (67) and the second flow line terminal (65), sliding on spherical-shaped housings (25, 26).

11. Tool for simultaneous vertical connections, according to claim 1, wherein, in said turning system of the second connector (3), the turning of said second connector (3) is allowed due to the simultaneous movement of shafts of said cylinders (21, 22).

12. Tool for simultaneous vertical connections, according to claim 1, wherein, in said guide-line orientation system, the attachment of said guide arm (4) to said first connector (2) is effected through a slot key (70).

13. Tool for simultaneous vertical connections, according to claim 1, wherein said bridge of fluid connectors (41) contains two vertical connectors (66) and (67) united by flow/control lines in an arrangement between said two flow line terminals (64, 65) to be connected.

* * * * *